US012684268B2

(12) United States Patent (10) Patent No.: US 12,684,268 B2
Lee et al. (45) Date of Patent: Jul. 14, 2026

(54) IMAGE SENSING DEVICE AND METHOD OF OPERATING THE SAME

(71) Applicant: SK hynix Inc., Gyeonggi-do (KR)

(72) Inventors: Eun Chang Lee, Gyeonggi-do (KR); Min Kyu Kim, Gyeonggi-do (KR); Han Sang Kim, Gyeonggi-do (KR); Da Hwan Park, Gyeonggi-do (KR); Sang Young Lee, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 131 days.

(21) Appl. No.: 18/672,009

(22) Filed: May 23, 2024

(65) Prior Publication Data

US 2026/0039977 A1 Feb. 5, 2026

(51) Int. Cl.
H04N 25/773 (2023.01)
G01S 7/4863 (2020.01)
G01S 17/894 (2020.01)

(52) U.S. Cl.
CPC ......... H04N 25/773 (2023.01); G01S 7/4863 (2013.01); G01S 17/894 (2020.01)

(58) Field of Classification Search
CPC .... H04N 25/773; H04N 25/70; G01S 7/4863; G01S 17/894; G01S 7/4865; G01S 17/89; G01S 7/484; G01S 7/4861; G01J 2001/4466
See application file for complete search history.

(56) References Cited

U.S. PATENT DOCUMENTS

| | | | | |
|---|---|---|---|---|
| 6,757,017 B1* | 6/2004 | Lee | ......................... | H04N 23/84 |
| | | | | 348/E5.037 |
| 2015/0364635 A1* | 12/2015 | Bodlovic | ............. | H04N 25/773 |
| | | | | 250/214.1 |
| 2019/0327424 A1* | 10/2019 | Sasaki | .................. | H04N 25/773 |
| 2020/0252564 A1* | 8/2020 | Palubiak | .............. | H10F 77/959 |
| 2022/0252700 A1 | 8/2022 | Ta et al. | | |
| 2023/0094219 A1* | 3/2023 | Takatsuka | ........... | H10F 39/8053 |
| | | | | 257/292 |
| 2023/0243928 A1* | 8/2023 | Al Abbas | ................ | G01S 7/487 |
| | | | | 356/5.01 |
| 2023/0384448 A1* | 11/2023 | Xie | ......................... | G01S 7/484 |
| 2024/0319007 A1* | 9/2024 | Kuo | .......................... | G01J 1/44 |

FOREIGN PATENT DOCUMENTS

KR 10-2022-0147588 A 11/2022

\* cited by examiner

*Primary Examiner* — Thanh Luu
*Assistant Examiner* — Mai Thi Ngoc Tran
(74) *Attorney, Agent, or Firm* — IP & T GROUP LLP

(57) ABSTRACT

An image sensing device capable of detecting a distance to a target object according to a time-of-flight (TOF) method is disclosed. The image sensing device includes a pixel configured to generate a pulse signal based on photons reflected from a target object, the pixel including a light receiving element of which sensitivity is controlled according to a quenching control voltage, a time-to-digital converter (TDC) configured to count the number of the photons to output a photon counting value, and a controller configured to adjust a level of the quenching control voltage based on the photon counting value.

18 Claims, 5 Drawing Sheets

10

IMAGE SENSING DEVICE AND METHOD OF OPERATING THE SAME

CROSS-REFERENCE TO RELATED APPLICATION

This patent application claims the priority to, and benefits of, Korean patent application No. 10-2024-0025175, filed on Feb. 21, 2024, which is hereby incorporated herein by reference in its entirety.

TECHNICAL FIELD

Embodiments of the present disclosure relate to an image sensing device capable of detecting a distance to a target object according to a time-of-flight (TOF) method.

BACKGROUND

Time of Flight (TOF) technology, which has been in the spotlight, emits pulse-shaped light from a light source located within or near a sensor to a target object, receives light reflected from the target object, calculates a round trip time using emitted light and reflected light, and measures a distance to the target object using the calculated round trip time according to the principle of constancy of light velocity. To precisely measure the TOF, since a reaction must occur as soon as light reaches a light receiving element, photo-electric conversion elements with very high sensitivity are required for TOF technology. To this end, research on single-photon avalanche diodes (SPADs) which can be manufactured by CMOS fabrication technology has been actively conducted.

However, characteristics of a high-resolution TOF sensor that uses a SPAD element to detect a distance to a target object may depend on characteristics of the SPAD element. Depending on how a quenching circuit designed to process output signals of the SPAD element controls the SPAD element, output characteristics of the SPAD element can be determined and characteristics of the TOF sensor can be changed.

SUMMARY

Various embodiments of the present disclosure relate to an image sensing device capable of controlling sensitivity of one or more SPAD elements by adjusting a quenching circuit depending on a distance to the target object.

In accordance with an embodiment of the present disclosure, an image sensing device may include: a pixel configured to generate a pulse signal based on photons reflected from a target object, the pixel including a light receiving element of which sensitivity is controlled according to a quenching control voltage; a time-to-digital converter (TDC) configured to count the number of the photons to output a photon counting value; and a controller configured to adjust a level of the quenching control voltage based on the photon counting value.

In accordance with another embodiment of the present disclosure, an image sensing device may include: a light receiving element connected between a sensing node and an input terminal of a first bias voltage; a quenching circuit connected between the sensing node and an input terminal of a second bias voltage and configured to adjust a resistance value thereof based on a quenching control voltage; and a controller configured to control the quenching control voltage based on a counting value of photons reflected from a target object.

In accordance with still another embodiment of the present disclosure, a method of operating an image sensing device with a pixel including a light receiving element connected to a sensing node is provided. The method may include generating a pulse signal based on photons reflected from a target object; counting a number of the photons to output a photon counting value; generating a quenching control voltage having a level adjusted based on the photon counting value; and adjusting a quenching speed of a voltage level of the sensing node according to the level of the quenching control voltage to control sensitivity of the light receiving element.

It is to be understood that both the foregoing general description and the following detailed description of the present disclosure are illustrative and descriptive and are intended to provide further description of the embodiments of the present disclosure as claimed.

BRIEF DESCRIPTION OF THE DRAWINGS

The above and other features and beneficial aspects of the embodiments of the present disclosure will become readily apparent with reference to the following detailed description when considered in conjunction with the accompanying drawings.

DETAILED DESCRIPTION

Figure 1:
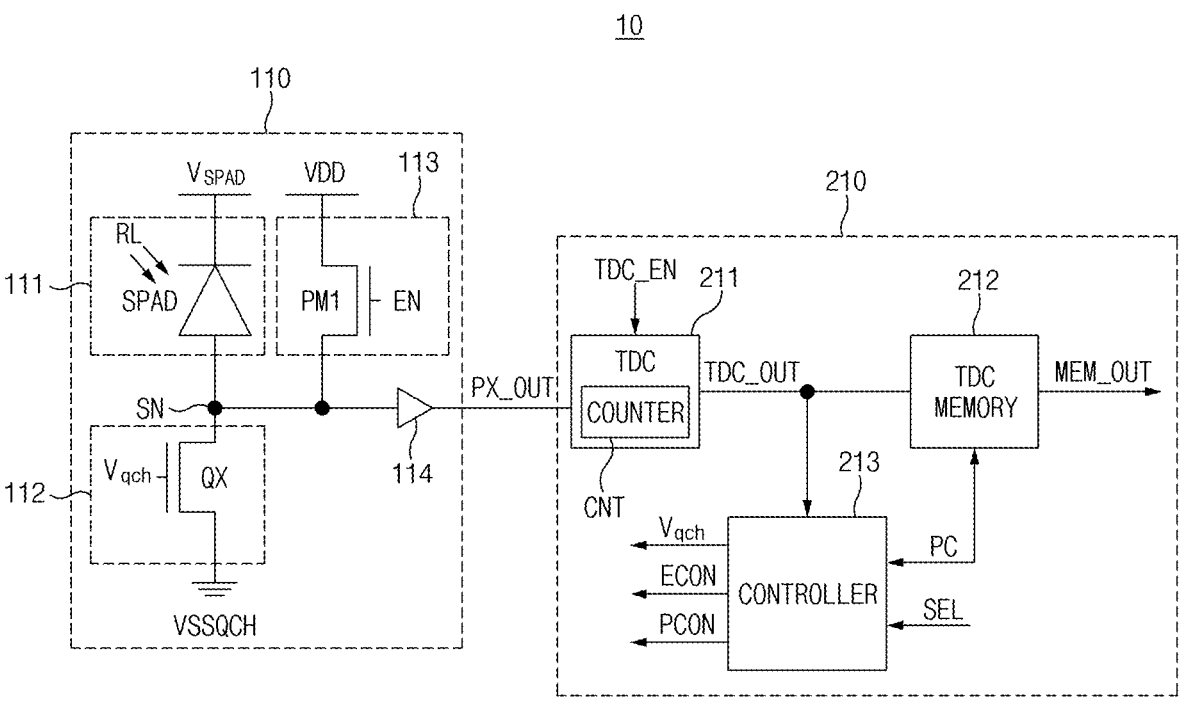
FIG. 1 is a diagram illustrating a configuration of an image sensing device according to an embodiment of the present disclosure.

The present disclosure provides embodiments and examples of an image sensing device capable of detecting a distance to a target object according to a time-of-flight (TOF) method that may be used in configurations to substantially address one or more technical or engineering issues and to mitigate limitations or disadvantages encountered in some image sensing devices in the art. An embodiment of the present disclosure relates to an image sensing device capable of controlling sensitivity of one or more SPAD elements by adjusting a quenching circuit depending on the distance to the target object. In recognition of the issues above, the embodiments of the present disclosure can implement an image sensing device with optimized sensing sensitivity.

Reference will now be made in detail to some embodiments of the present disclosure, examples of which are illustrated in the accompanying drawings. Wherever possible, the same reference numbers will be used throughout the drawings to refer to the same or like parts. While this disclosure is susceptible to various modifications and alternative forms, specific embodiments thereof are shown by way of example in the drawings. However, the present disclosure should not be construed as being limited to the embodiments set forth herein.

Hereinafter, various embodiments will be described with reference to the accompanying drawings. However, it should be understood that the present disclosure is not limited to specific embodiments, but includes various modifications, equivalents and/or alternatives of the embodiments. The embodiments of the present disclosure may provide a variety of effects capable of being directly or indirectly recognized.

FIG. 1 is a diagram illustrating a configuration of an image sensing device 10 according to an embodiment of the present disclosure.

Referring to FIG. 1, the image sensing device 10 may include a pixel 110 and a readout circuit 210.

Here, the pixel 110 includes a single-photon avalanche diode (SPAD) element (hereinafter referred to as a "SPAD" element) 111, a quenching circuit 112, and a precharge circuit 113, and a pulse generator 114.

Here, the SPAD element 111 may detect a single photon reflected by a target object (TO in FIG. 5), and may generate a voltage pulse corresponding to the detected single photon.

The SPAD element 111 may operate as a photodiode including a photosensitive P-N junction. Since avalanche breakdown is triggered by a single photon incident in a Geiger mode in which a reverse bias voltage caused by a cathode-anode voltage higher than a breakdown voltage occurs, the SPAD element 111 may generate a current pulse. Here, the Geiger mode may mean applying a reverse bias voltage greater than the breakdown voltage to the SPAD element 111 in order to detect a single photon in the SPAD element 111. In the Geiger mode, since the intensity of an electric field applied to an amplifying layer is large, even if the small number of photons are absorbed, an avalanche current breakdown phenomenon occurs and a large amount of current is output, such that a single photon can be detected. In this way, the process in which avalanche breakdown is triggered by a single photon and a current pulse is generated will hereinafter be defined as an avalanche process.

The SPAD element 111 may receive a first bias voltage VSPAD through one terminal (i.e., a cathode) thereof. The other terminal (i.e., an anode) of the SPAD element 111 may be connected to a sensing node SN. The SPAD element 111 may generate a current pulse by detecting a single photon and may output the generated current pulse to the sensing node SN. When a reverse bias voltage greater than the breakdown voltage is applied as the first bias voltage VSPAD to one terminal of the SPAD element 111, carriers generated by incidence of a single photon may cause avalanche amplification, such that a large amount of current can be output to the SPAD element 111.

Although the embodiment of the present disclosure has disclosed that the SPAD element 111 is illustrated as a light receiving element (i.e., a light detection element) of the pixel 110, the scope of the embodiment is not limited to the SPAD element 111. That is, as a light receiving element of the pixel 110, in addition to the SPAD element 111, various elements operating in the Geiger mode, such as an avalanche photodiode (APD), a silicon photomultiplier (SiPM), and the like, can be used.

The quenching circuit 112 may process the output signal of the SPAD element 111 and may output the processed signal to the sensing node SN. After a voltage pulse is generated due to avalanche breakdown and the voltage of the sensing node SN increases, the quenching circuit 112 may perform a quenching operation for returning the voltage of the sensing node SN to a bias voltage VSSQCH (or for returning the SPAD element 111 to the Geiger mode).

The quenching circuit 112 may include a quenching transistor QX that is connected between the sensing node SN and an input terminal of the second bias voltage VSSQCH to receive the quenching control voltage Vqch through a gate terminal thereof. As an example, the quenching transistor QX may be an N-channel metal-oxide-semiconductor (NMOS) transistor. Although the quenching circuit 112 is shown as an NMOS transistor in this embodiment, other embodiments are also possible, and it should be noted that the quenching circuit 112 can also be applied as a P-channel metal-oxide-semiconductor (PMOS) transistor.

The quenching control voltage Vqch may have a turn-on voltage when the voltage of the sensing node SN increases due to generation of a voltage pulse, and may have a turn-off voltage when the voltage of the sensing node SN returns to the second bias voltage VSSQCH. In the embodiments of the present disclosure, the quenching control voltage Vqch may be supplied from the controller 213, which will be described later, however other configurations may also be used to supply the quenching voltage.

In addition, the precharge circuit 113 may precharge the sensing node SN to the power supply voltage VDD level in response to an enable signal EN. The precharge circuit 113 may include a transistor PM1 that is connected between the power supply voltage VDD input terminal and the sensing node SN to receive the enable signal EN through a gate terminal thereof. The transistor PM1 may be a PMOS transistor.

For example, the quenching transistor QX and the PMOS transistor PM1 may operate complementarily to each other. Accordingly, when the quenching control voltage Vqch is activated to the turn-on voltage level, the quenching transistor QX may be turned on and the PMOS transistor PM1 may be turned off. On the other hand, when the quenching control voltage Vqch is deactivated to the turn-off voltage level, the quenching transistor QX may be turned off and the PMOS transistor PM1 may be turned on. As a result, when the PMOS transistor PM1 is turned on, the sensing node SN can be precharged to the power supply voltage VDD level.

The pulse generator 114 may generate a pulse signal based on an electrical signal generated according to photons incident upon the pixel 110, and may output a pixel signal PX_OUT. The pulse generator 114 may generate a pulse signal at a frequency indicating how often photons are received. The pulse generator 114 may sample an analog voltage pulse generated from the sensing node SN, and may convert the analog voltage pulse into a digital pulse signal (i.e., SPAD pulse). Here, the sampling method may be a method of converting the voltage pulse into a pulse signal with a logic level of 0 or 1 depending on whether the level of the voltage pulse is greater than or equal to a threshold level, but the scope of the present disclosure is not limited thereto.

Furthermore, the readout circuit 210 may include a time-to-digital converter TDC 211, a TDC memory 212, and a controller 213.

In an embodiment, the pixel 110 may be included in the pixel array 100 of FIG. 5 to be described later, and the TDC 211, the TDC memory 212, and the controller 213 may be included in the readout circuit 210 of FIG. 5 to be described later. However, according to another embodiment, at least one of the TDC 211, the TDC memory 212, and the controller 213 may be included in the pixel array 100.

The TDC 211 may calculate a time delay between the SPAD pulse of the pixel signal PX_OUT output from the pixel 110 and a reference pulse of emitted light ('EL' in FIG. 5), and may generate TDC data TDC_OUT indicating the time delay. In an embodiment, the pulse signal of the pixel signal PX_OUT generated by the pixel 110 may be referred to as a SPAD pulse. According to an embodiment, the TDC 211 may generate the TDC data TDC_OUT by performing a counting operation from a time point of generating the reference pulse to a time point of generating the SPAD pulse. The TDC 211 may obtain information about the time point of generating the reference pulse of emitted light EL from a timing controller (220 in FIG. 5) that controls a light source driver (230 in FIG. 5), or may determine a predetermined time point (e.g., a time point located before a preset time from a start time point of the frame) to be a time point of generating the reference pulse.

According to an embodiment, the TDC 211 may include a counter CNT that counts the number of photons incident during a certain period of time, and may output a photon counting value PC. Here, the photon counting value PC may be a sum of the number of photons input within a frame period. The photon counting value PC output from the counter CNT may be numerical digital values for the number of photons. The counter CNT may temporarily store the photon counting value PC, and may output the photon counting value PC according to the TDC enable signal TDC_EN. Here, the TDC 211 may convert the pixel signal PX_OUT into a digital value proportional to the photon counting value PC, and may output TDC data TDC_OUT.

The TDC 211 may be activated or deactivated according to the TDC enable signal TDC_EN supplied from the timing controller 220. The TDC enable signal TDC_EN may have an activation level (e.g., a logic high level) when generation of TDC data TDC_OUT for the pixel 110 is required, and may have a deactivation level (e.g., a logic low level) when generation of TDC data TDC_OUT for the pixel 110 is not required (e.g., when capacity of the TDC memory 212 is full).

The TDC memory 212 may store TDC data TDC_OUT, and may output memory output data MEM_OUT to an image signal processor (ISP in FIG. 5) in a certain unit (e.g., a frame unit). The TDC memory 212 may store the photon counting value PC as one of TDC data TDC_OUT. For example, the TDC memory 212 may accumulate and store photon counting values PC detected over successive time bins.

The controller 213 may read the photon counting value PC from the TDC memory 212. The controller 213 may control the sensitivity of the SPAD element 111 by adjusting a level of the quenching control voltage Vqch based on the photon counting value PC. For example, the controller 213 may determine the photon counting value PC based on a preset threshold, and may adjust the level of the quenching control voltage Vqch differently.

According to an embodiment, the controller 213 may generate an exposure control signal ECON to adjust an exposure time for sensing the amount of light based on the photon counting value PC. According to another embodiment, the controller 213 may generate an optical power control signal PCON for adjusting optical power (i.e., the intensity of emitted light) of emitted light EL that is emitted to the target object TO based on the photon counting value PC. The controller 213 may adjust the level of the quenching control voltage Vqch, control the exposure control signal ECON, or selectively control the optical power control signal PCON based on the selection signal SEL. The selection signal SEL applied to the controller 213 may be generated by a pixel driver (200 in FIG. 5) or the timing controller 220. For example, the pixel driver 200 or the timing controller 220 may control the selection signal SEL based on the degree of inclusion of noise components included in signals due to occurrence of background light (i.e., ambient light) or the like.

The image sensing device 10 may accumulate a hit count value of laser light (i.e., reflected light) that is reflected from the target object TO and returns to the image sensing device 10 to a plurality of time bins, and may calculate information about the distance to the target object based on a time bin having the largest hit count value from among the plurality of time bins. The laser light may be projected in the form of dots through the image sensing device 10. Depending on the distance to the target object, the position of projected points may change or the intensity of the projected points may become stronger or weaker. At the beginning of operation of the image sensing device 10, the image sensing device 10 may operate in a photon counting mode to find the position of such points.

The controller 213 may set a threshold value of the photon counting value PC in this photon counting mode. The controller 213 may compare the photon counting value PC with a preset threshold value, may adjust the level of the quenching control voltage Vqch differently according to the comparison result, and may thus adjust the sensitivity of the SPAD element 111. The controller 213 may compare the photon counting value PC with a preset threshold value, and may generate an exposure control signal ECON to adjust the exposure time according to the comparison result. The controller 213 may compare the photon counting value PC with a preset threshold value, and may generate an optical power control signal PCON for adjusting the optical power according to the comparison result. The operation of controlling the sensitivity or exposure time of the SPAD element 111 by the controller 213 will be described in more detail with reference to FIGS. 2 and 3 to be described later.

The image sensing device 10 using a direct TOF method may have optical power and noise (e.g., noise after pulsing, dark count, background light, interference light, etc.) that differently affect sensor(s) depending on the distance to the target object, and may have optimal settings for processing the optical power and noise.

For example, when the distance between the sensor and the target object is short and setting information required to acquire the large amount of data (e.g., the photon counting value PC) is used, noise and more data than necessary may be obtained. In this case, there may occur a pile-up problem or a peak value of a histogram may not be selected. On the other hand, when the distance between the sensor and the target object is long, if setting data that acquires the small amount of data is used, data to be used for finding the histogram peak becomes insufficient so that it may be impossible to acquire the actual distance data.

Accordingly, the image sensing device 10 may adjust the sensitivity of the SPAD element 111, the exposure time, or the optical power based on the photon counting value PC that varies depending on the distance, thereby improving characteristics of the direct TOF sensor.

Figure 2:
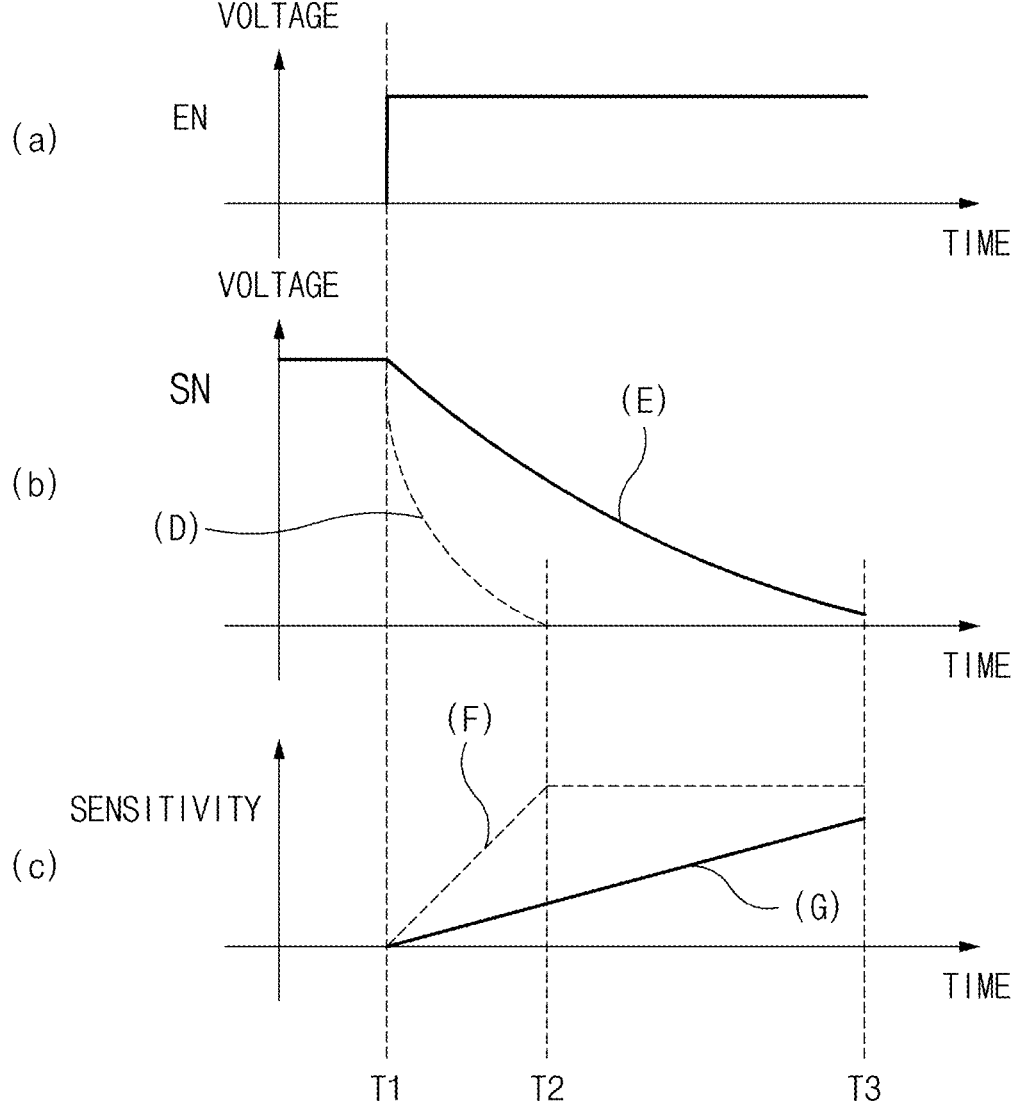
FIG. 2 are graphs showing characteristics of a pixel shown in FIG. 1 according to an embodiment of the present disclosure.

FIG. 2 are graphs showing characteristics of the pixel 110 shown in FIG. 1, according to an embodiment of the present disclosure.

Referring to FIG. 2, the precharge circuit 113 of the pixel 110 may be activated in a time section before a time point T1, so that the sensing node SN may be precharged to the power supply voltage VDD level. In the time section after the time point T1, the quenching circuit 112 may be activated so that the sensitivity of the SPAD element 111 can be controlled based on the quenching control voltage Vqch.

If the enable signal EN is at a logic low level as shown in (a) of FIG. 2 before the time point T1, the transistor PM1 may be turned on. Then, as shown in (b) of FIG. 2, the sensing node SN may be precharged to the power supply voltage VDD level. When the sensing node SN is at the power supply voltage VDD level, the SPAD element 111 may be biased to a breakdown voltage and thus the quenching operation may not be performed. That is, a first bias voltage VSPAD may be a sum of the breakdown voltage and the power supply voltage VDD, and the power supply voltage VDD may be equal to an excess voltage. Here, the excess voltage may be a value obtained by subtracting the breakdown voltage from a voltage generated between a cathode and an anode in the Geiger mode.

After lapse of the time point T1, if the enable signal EN transitions to a logic high level as shown in (a) of FIG. 2, the transistor PM1 may be turned off. In addition, the quenching transistor QX may be turned on by the quenching control voltage Vqch. When the quenching transistor QX is turned on, the voltage of the sensing node SN may gradually decrease to a second bias voltage VSSQCH level.

The quenching circuit 112 may function as a resistor in which the quenching transistor QX is adjusted according to the quenching control voltage Vqch. Accordingly, the speed at which the voltage level of the quenching circuit 112 decreases may vary depending on a resistance value of the quenching transistor QX.

For example, when the quenching control voltage Vqch is high as shown in (D) of the graph of (b) of FIG. 2, the resistance of the quenching transistor QX becomes small, so that the voltage of the sensing node SN may decrease to the second bias voltage VSSQCH level at high speed (at a time point T2). That is, the voltage biased to the SPAD element 111 may quickly reach the first bias voltage VSPAD level. As the excess voltage biased to the SPAD element 111 increases, the response probability of the SPAD element 111 may also increase. In this case, the above-described example may mean that the sensitivity of the SPAD element 111 increases rapidly up to the time point T2 as shown in (F) of the graph of (c) of FIG. 2.

On the other hand, when the quenching control voltage Vqch is low as shown in (E) in the graph of (b) of FIG. 2, the resistance of the quenching transistor QX may increase, so that the voltage of the sensing node SN may decrease to the second bias voltage VSSQCH level at low speed (at a time point T3). That is, the voltage biased to the SPAD element 111 may slowly reach the first bias voltage VSPAD level. As the excess voltage biased to the SPAD element 111 decreases, the response probability of the SPAD element 111 may decrease. In this case, the above-described example may mean that the sensitivity of the SPAD element 111 slowly increases up to the time point T3 as shown in (G) of the graph of (c) of FIG. 2.

Accordingly, the controller 213 may control the sensitivity of the SPAD element 111 by adjusting the level of the quenching control voltage Vqch based on characteristic information of the quenching circuit 112.

Figure 3:
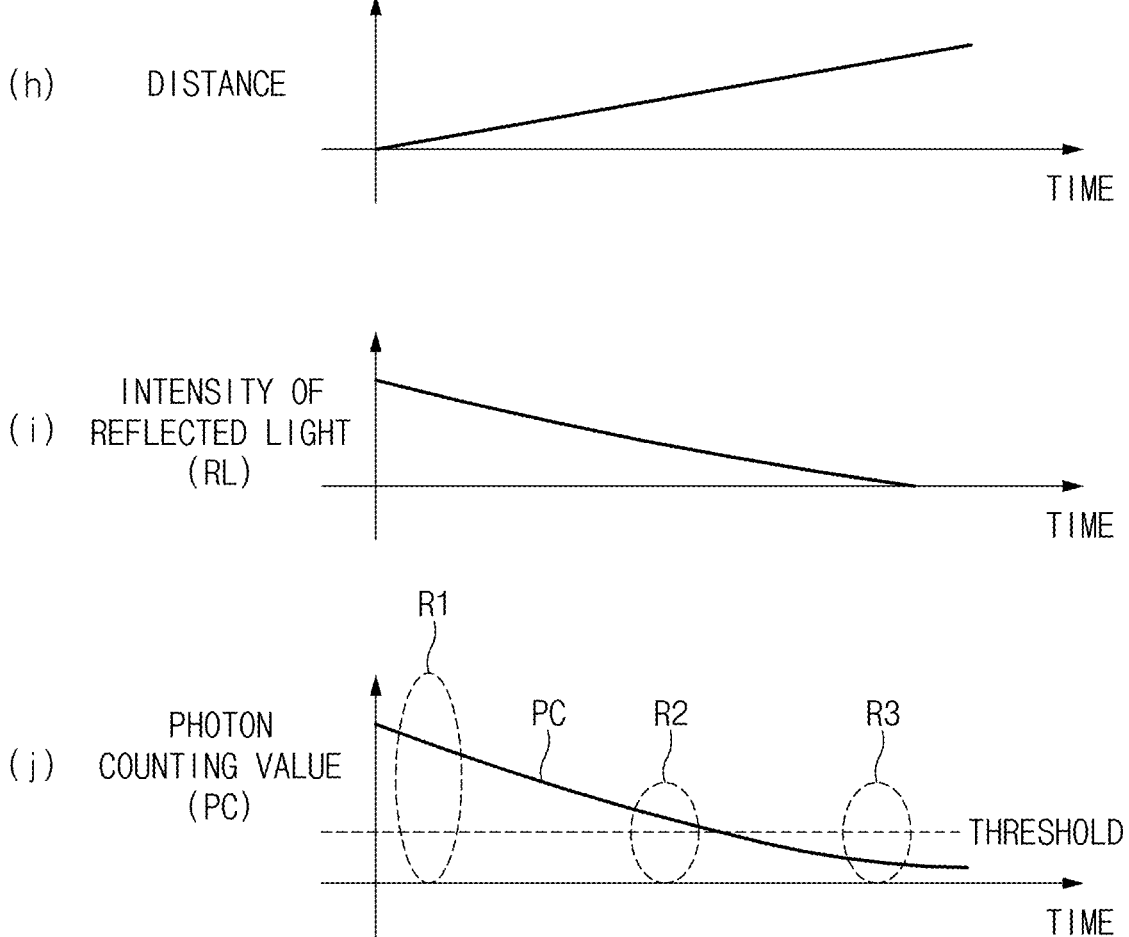
FIG. 3 are graphs showing operations of a controller shown in FIG. 1 according to an embodiment of the present disclosure.

FIG. 3 are graphs showing operations of the controller 213 shown in FIG. 1, according to an embodiment of the present disclosure.

Referring to FIG. 3, the image sensing device 10 using the direct TOF method may have different optical power levels (e.g., different intensities of reflected light) depending on the distance to the target object. For example, referring to the graph of (h) of FIG. 3 and the graph of (i) of FIG. 3, the intensity of reflected light may become weaker as the distance to the target object becomes longer, and the intensity of reflected light may become stronger as the distance to the target object becomes shorter. That is, the intensity of reflected light may be inversely proportional to the distance to the target object.

Referring to the graph of (j) of FIG. 3, as the distance to the target object increases, the number of counted photons may decrease. If the distance to the target object is short, this means that the optical power is considered sufficient, so that the photon counting value PC for histogramming can be sufficiently secured (see 'R1' region). On the other hand, when the distance to the target object increases, the optical power weakens, so that the photon counting value PC for histogramming may not be sufficiently secured (see 'R2' region). In addition, as the distance to the target object gradually increases, the optical power may become excessively weakened (see 'R3' region). As a result, the photon counting value PC for histogramming becomes smaller than the threshold value, so that a histogram that is indistinguishable from background light can be obtained.

Therefore, the controller 213 may control the sensitivity of the SPAD element 111 by adjusting the quenching control voltage Vqch to different levels according to the photon counting value PC as shown in the above R1, R2, and R3 situations. That is, photon detection efficiency (PDE) may be controlled by reducing or increasing the number of photons according to adjustment of the sensitivity of the SPAD element 111. Here, the photon detection efficiency (PDE) may represent the ratio of the number of counted photons to the number of incident photons when light is incident and photon counting is then performed. In addition, the controller 213 may control the photon detection efficiency (PDE) by controlling the exposure time or the optical power according to the photon counting value PC as shown in the above R1, R2, and R3 situations.

Figure 4:
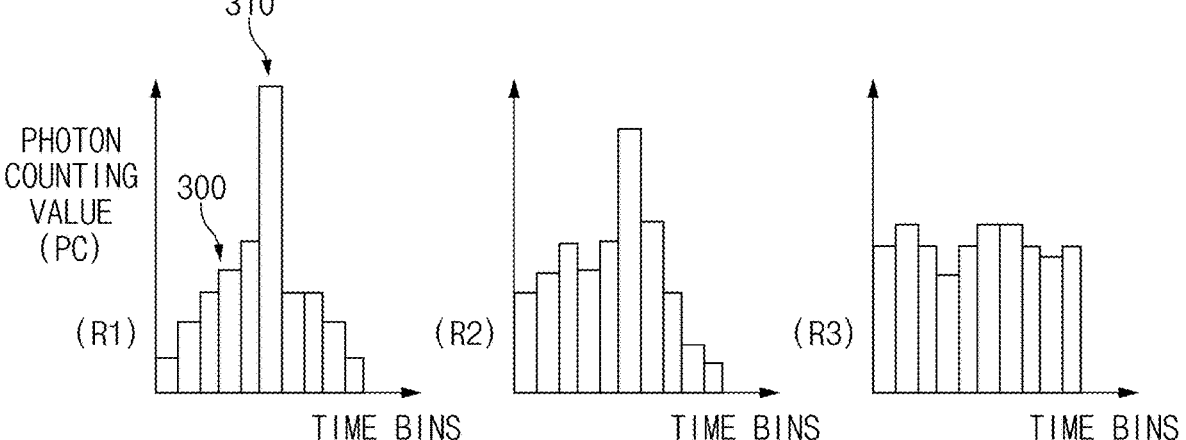
FIG. 4 are histograms according to photon counting values shown in FIG. 3 according to an embodiment of the present disclosure.

FIG. 4 are histograms according to photon counting values shown in FIG. 3, according to an embodiment of the present disclosure.

Referring to FIG. 4, a horizontal axis of the histogram may represent a time bin that can represent each subrange of photon arrival times. A vertical axis of the histogram may represent the photon counting value PC. The counter at the initial time bin may be relatively low and may correspond to background noise 300. Then, a reflected pulse 310 may be detected at some time points of time bins.

Since the R1 region shown in FIG. 3 indicates that the photon counting value PC is sufficiently secured to be higher than a predetermined value, the size of the reflection pulse 310 may be larger than a threshold value that distinguishes the background noise from the detected pulse. In this case, the controller 213 may control the sensitivity of the SPAD element 111 to be increased slowly by lowering the level of the quenching control voltage Vqch.

According to an embodiment, the controller 213 may determine that the photon counting value PC is sufficiently secured to be higher than a threshold photon counting value PC when the distance to the target object is short, and may reduce the photon counting value PC by activating the exposure control signal ECON to shorten the exposure time. The controller 213 may output the exposure control signal ECON at a first logic level when the photon counting value PC is greater than the threshold value. The exposure control signal ECON may be input to the image signal processor ISP (to be described later). The image signal processor ISP may control the exposure time of data acquired within one frame to be shorter than a preset time in response to the exposure control signal ECON of the first logic level.

However, in environments with large amounts of noise (e.g., noise components generated by internal and external factors such as background noise 300), high sensitivity of the SPAD element 111 can be obtained even if the exposure time is short, so that a histogram containing a large amount of noise can be obtained. Accordingly, when the noise level is higher than a preset level in response to the selection signal SEL, the controller 213 may control the sensitivity of the SPAD element 111 to be increased slowly by lowering the level of the quenching control voltage Vqch rather than controlling the exposure time. To this end, the controller 213 may preset a reference value for the noise level.

According to another embodiment, when the distance to the target object is short as shown in the R1 region of FIG. 3, the controller 213 may determine that the photon counting value PC is sufficiently secured to be equal to or greater than the threshold value, and may activate the optical power control signal PCON to reduce the optical power, resulting in reduction in the photon counting value PC. That is, the controller 213 may output the optical power control signal PCON at the first logic level when the photon counting value PC is greater than the threshold value. The optical power control signal PCON may be input to the timing controller 220 to be described later. The timing controller 220 may control the light source driver 230 in response to the optical power control signal PCON of the first logic level, and may thus control the optical power of emitted light applied to the target object to be shorter than a preset time. When the optical power decreases, the photon counting value PC counted by the counter CONT may decrease.

In addition, since the R2 region shown in FIG. 3 indicates that the photon counting value PC is not sufficiently secured, the magnitude of the reflection pulse 310 may be smaller than the magnitude of the reflection pulse 310 of the R1 region. In this case, the controller 213 may control the sensitivity of the SPAD element 111 to be increased slowly by lowering the level of the quenching control voltage Vqch, or may control the sensitivity of the SPAD element 111 to be increased quickly by increasing the level of the quenching control voltage Vqch. That is, the controller 213 may selectively adjust the sensitivity of the SPAD element 111 so that a photon counting value that can distinguish the reflection pulse 310 from the background noise 300 can be secured.

Depending on the embodiment, when the distance to target object TO in the R2 region becomes longer than that of the R1 region, the photon counting value PC may be equal to or greater than the threshold value or may decrease similar to the threshold value. In this case, the controller 213 may control the exposure time to satisfy a specific range in which the background noise 300 and the reflection pulse 310 can be distinguished from each other. That is, the controller 213 may determine how much higher the photon counting value PC is than the threshold value, and may output the exposure control signal ECON at the first logic level or the second logic level.

As a result, the image signal processor ISP may control the exposure time to be shorter than a preset time in response to the exposure control signal ECON of the first logic level. On the other hand, the image signal processor ISP may control the exposure time to be longer than a preset time in response to the exposure control signal ECON of the second logic level.

According to another embodiment, the controller 213 may determine how much higher the photon counting value PC is than the threshold value, and may output the optical power control signal PCON at a first logic level or a second logic level. Then, the timing controller 220 may control the light source driver 230 in response to the optical power control signal PCON of the first logic level, and may thus control the optical power of the emitted light applied to the target object to be shorter than a preset time. Then, the photon counting value PC may be adjusted to be relatively small. On the other hand, the timing controller 220 may control the light source driver 230 in response to the optical power control signal PCON of the second logic level, and may thus control the optical power of the emitted light applied to the target object to be longer than a preset time. Then, the photon counting value PC may be adjusted to be relatively high.

As can be seen from the R3 region of FIG. 3, the photon counting value PC is smaller than the threshold value, so that a histogram in which the background noise 300 and the reflection pulse 310 cannot be distinguished from each other can be obtained. In this case, the controller 213 may control the sensitivity of the SPAD element 111 to be increased rapidly by increasing the level of the quenching control voltage Vqch.

Depending on the embodiment, when the distance to the target object TO in the R3 region becomes longer than that of the R2 region, the photon counting value PC may decrease to a threshold value or less. In this case, the controller 213 may increase the exposure time to distinguish between the background noise 300 and the reflection pulse 310. That is, the controller 213 may output the exposure control signal ECON at a second logic level when the photon counting value PC is lower than the threshold value. Then, the image signal processor ISP may control the exposure time to be longer than a preset time in response to the exposure control signal ECON of the second logic level.

According to another embodiment, when the distance to the target object in the R3 region becomes longer than that of the R2 region, the controller 213 may increase the optical power to distinguish between the background noise 300 and the reflection pulse 310. That is, the controller 213 may output the optical power control signal PCON at the second logic level when the photon counting value PC is lower than a threshold value. As a result, the timing controller 220 may control the light source driver 230 to adjust the optical power to be longer than a preset time.

Figure 5:
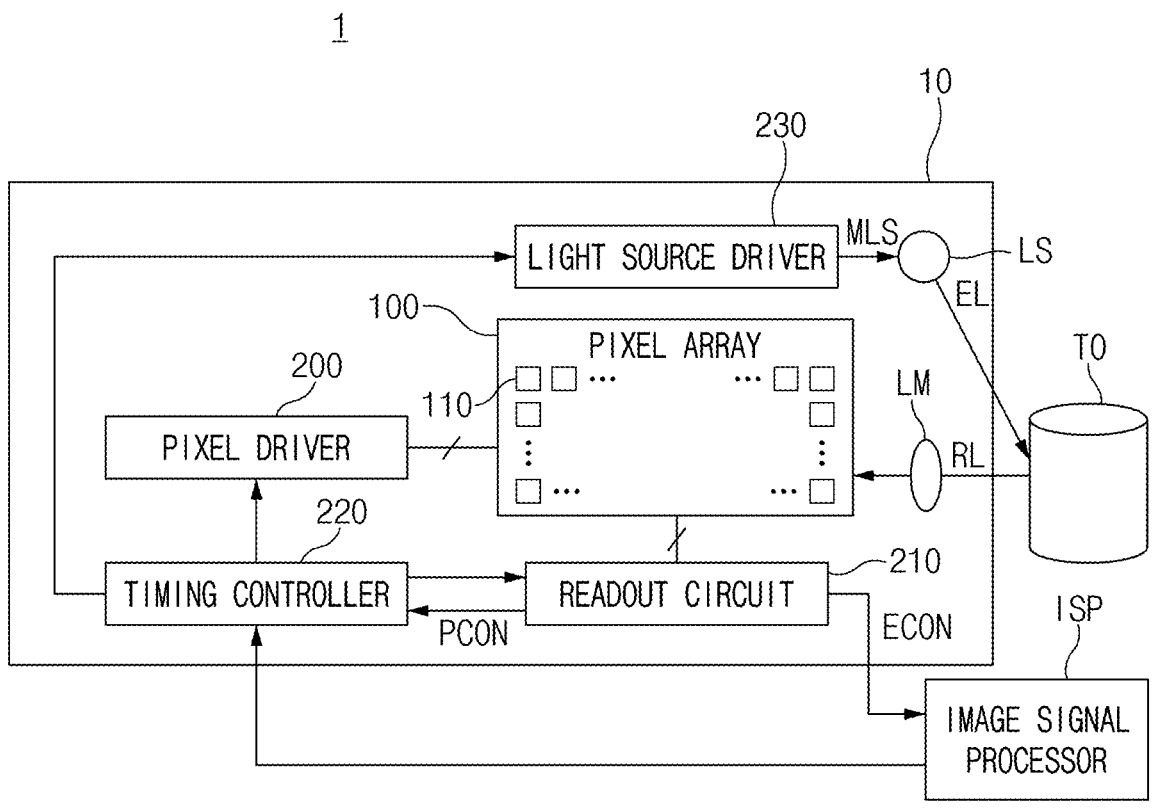
FIG. 5 is a diagram illustrating a configuration of an imaging device including an image sensing device of FIG. 1 according to an embodiment of the present disclosure.

FIG. 5 is a diagram illustrating a configuration of an imaging device 1 including the image sensing device 10 of FIG. 1 according to an embodiment of the present disclosure.

Referring to FIG. 5, the imaging device 1 may refer to a device, for example, a digital still camera for photographing still images or a digital video camera for photographing moving images. For example, the imaging device 1 may be implemented as a Digital Single Lens Reflex (DSLR) camera, a mirrorless camera, a smartphone, and others. The imaging device 1 may include a device having both a lens and an image pickup element such that the device can capture (or photograph) a target object and can thus create an image of the target object. In an embodiment, the imaging device 1 may be implemented as a Lidar sensor.

The imaging device 1 may include an image sensing device 10 and an image signal processor ISP.

The image sensing device 10 may be or include a complementary metal oxide semiconductor image sensor CIS for converting an optical signal into an electrical signal. The image sensing device 10 may measure the distance to a target object using a Time of Flight (TOF) method.

The image sensing device 10 may include a light source LS, a lens module LM, a pixel array 100, a pixel driver 200, a readout circuit 210, a timing controller 220, and a light source driver 230. Referring to FIG. 5, the pixel 110 included in the pixel array 100 may represent the pixel 110 of FIG. 1, and the readout circuit 210 may represent the readout circuit 210 of FIG. 1, and may operate as shown in FIGS. 2 to 4.

The light source LS may emit light to a target object TO upon receiving a clock signal MLS from the light source driver 230. The light source LS may be a laser diode (LD) or a light emitting diode (LED) for emitting light (e.g., infrared light or visible light) having a specific wavelength band, or may be any of a Near Infrared Laser (NIR), a point light source, a monochromatic light source combined with a white lamp or a monochromator, and a combination of other laser sources. For example, the light source LS may emit infrared (IR) light having a wavelength of 800 nm to 1000 nm. In an embodiment, the following description will be made based on that the light source LS emits infrared light, however other light wavelengths may be used. On the other hand, light emitted from the light source LS may be pulse light having a predetermined period, amplitude, and pulse width. Although FIG. 5 shows only one light source LS for convenience of description, the embodiments of the present disclosure are not limited thereto, and a plurality of light sources LS may also be arranged in the vicinity of the lens module LM.

The lens module LM may collect light reflected from the target object TO, and may allow the collected light to be focused onto pixels 110 of the pixel array 100. For example, the lens module LM may include a focusing lens having a surface formed of glass or plastic or another cylindrical optical element having a surface formed of glass or plastic. The lens module LM may include a plurality of lenses arranged around an optical axis.

The pixel array 100 may include a plurality of pixels 110 consecutively arranged in a two-dimensional (2D) matrix structure in which pixels 110 are consecutively arranged in a column direction and a row direction perpendicular to the column direction. Each pixel 110 may convert incident light received through the lens module LM into an electrical signal corresponding to the amount of incident light, and may thus output a pixel signal using the electrical signal. In this case, the pixel signal may not indicate the color of the target object TO, and may be a signal indicating the distance to the target object TO.

The principle of operating the pixel 110 including the SPAD element 111 is as follows. When an electric field is increased by applying a reverse bias voltage to the SPAD element 111, impact ionization may occur in which a pair of an electron and a hole (hereinafter referred to as an electron-hole pair) is generated while an electron generated by a photon due to the strong electric field moves. Specifically, in the SPAD element 111 operating in the Geiger mode in which a reverse bias voltage that is higher than a breakdown voltage is applied, when electrons and holes generated by impact ionization caused by collision with carriers (i.e., electrons or holes) generated by incident light collide with each other, countless carriers can be generated. As a result, even if a single photon is incident upon the SPAD element 111, the single photon may trigger avalanche breakdown, so that a measurable current pulse can be generated.

Each pixel 110 may be an infrared pixel for generating a pixel signal by detecting incident light that includes reflected light RL generated when emitted light EL irradiated from the light source LS is reflected from the target object TO and is incident upon the pixel 110. In an embodiment, the infrared pixel may be a depth pixel for calculating the distance to the target object TO.

The pixel array 100 in which a plurality of pixels 110 is arranged may detect the distance to the target object TO using a direct TOF method. For reference, the direct TOF method may directly measure a round trip time from a first time where pulse light is emitted to the target object TO to a second time where pulse light reflected from the target object TO is incident, and may thus calculate the distance to the target object TO by calculating the round trip time and the speed of light.

The pixel driver 200 may drive the pixel array 100 under the control of the timing controller 220. For example, the pixel driver 200 may generate a control signal capable of selecting and controlling the pixels 110 included in at least one row line among the plurality of row lines of the pixel array 100. In addition, the pixel driver 200 may generate a recharge signal for controlling a recharging operation that implants charges into a sensing node connected to the SPAD element of the pixel 110.

The readout circuit 210 may be disposed at one side of the pixel array 100, may calculate a time delay between a pulse signal output from each pixel 110 and a reference pulse, and may generate digital data corresponding to the time delay. Here, the reference pulse may be a pulse of the clock signal MLS. The readout circuit 210 may include a digital logic circuit configured to generate digital data by calculating a time delay between a pulse signal of each pixel 110 and a reference pulse, and an output buffer configured to store the generated digital data. The digital logic circuit and the output buffer may hereinafter be collectively referred to as a Time-to-Digital Circuit (TDC, 211). The readout circuit 210 may transmit the stored digital data to the image signal processor ISP under the control of the timing controller 220.

The readout circuit 210 may process the pixel signal PX_OUT output from the pixel array 100 under the control of the timing controller 220, and may generate and store depth data for detecting the distance to the target object TO. Specifically, the readout circuit 210 may calculate a time of flight (TOF) corresponding to the SPAD pulse generated when each pixel 110 senses incident light including reflected light RL, and may store the TOF corresponding to the SPAD pulse. The readout circuit 210 may transmit the stored TOF to the image signal processor ISP under the control of the timing controller 220.

The readout circuit 210 may output a quenching control voltage Vqch to the quenching circuit 112 to adjust the sensitivity of the SPAD element 111. The readout circuit 210 may generate the exposure control signal ECON to control the exposure time of digital data acquired within one frame. The readout circuit 210 may generate the optical power control signal PCON for controlling the optical power of the emitted light EL.

The timing controller 220 may control overall operation of the image sensing device 10. That is, the timing controller 220 may generate a clock signal and a timing signal to control operations of the pixel driver 200 and the light source driver 230. According to an embodiment, the timing controller 220 may generate clock and timing signals in response to a request from the image signal processor ISP or data received from the readout circuit 210. The timing controller 220 may control the optical power of the emitted light EL by controlling the light source driver 230 in response to the optical power control signal PCON received from the readout circuit 210.

In addition, the timing controller 220 may control activation or deactivation of the readout circuit 210, and may control digital data stored in the readout circuit 210 to be simultaneously or sequentially transmitted to the image signal processor ISP. According to an embodiment, the timing controller 220 may include a logic control circuit, a phase lock loop (PLL) circuit, a timing control circuit, a communication interface circuit, and others.

The light source driver 230 may generate the clock signal MLS that can drive the light source LS under the control of the timing controller 220. The light source driver 230 may control waveforms (e.g., period, amplitude, pulse width, etc.) of the emitted light EL output from the light source LS.

The image signal processor ISP may control the operation of the image sensing device 10. In particular, the image signal processor ISP may determine an operation mode of the image sensing device 10 by analyzing digital data received from the image sensing device 10, and may control the image sensing device 10 to operate in the determined mode. The image signal processor ISP may control the exposure time of digital data acquired within one frame in response to the exposure control signal ECON received from the readout circuit 210.

The image signal processor ISP may process digital data received from the image sensing device 10, and may generate a depth image indicating the distance to the target object TO. In more detail, the image signal processor ISP may calculate the distance to the target object TO for each pixel 110 based on a time delay denoted by digital data received from the readout circuit 210.

The image signal processor ISP may perform image processing of image data received from the image sensing device 10. The image signal processor ISP may reduce noise of image data, and may perform various types of image signal processing (e.g. interpolation, lens distortion correction, etc.) for image-quality improvement of the image data.

Image data (IDATA) may include the above-described time of flight (TOF). The image signal processor ISP may generate a histogram for one frame by accumulating data, and may determine a target time-of-flight (TOF) for one frame based on the histogram. The TOF may be determined for each pixel 110, and the image signal processor ISP may determine a target distance (i.e., the distance to the target object TO detected by each pixel 110) based on the TOF of each pixel 110. A set (or aggregate) of target distances for the pixels 110 included in the pixel array 100 may be referred to as a depth image and may be included in processed image data.

The image signal processor ISP may transmit the image signal processed ISP image data to a host device (not shown). The host device may be a processor (e.g. an application processor) for processing the ISP image data received from the image signal processor ISP, a memory (e.g. a non-volatile memory) for storing the ISP image data, or a display device (e.g. a liquid crystal display (LCD)) for visually displaying the ISP image data.

As is apparent from the above description, the embodiments of the present disclosure can implement an image sensing device with optimized sensing sensitivity.

The embodiments of the present disclosure may provide a variety of effects capable of being directly or indirectly recognized.

Although a number of illustrative embodiments have been described, it should be understood that modifications and enhancements to the disclosed embodiments and other embodiments can be devised based on what is described and/or illustrated in the present disclosure. Furthermore, the embodiments can be combined to form additional embodiments.

What is claimed is:

1. An image sensing device comprising:
a pixel configured to generate a pulse signal based on photons reflected from a target object, the pixel including a light receiving element of which sensitivity is controlled according to a quenching control voltage;
a time-to-digital converter configured to count a number of the photons to output a photon counting value; and
a controller configured to adjust a level of the quenching control voltage based on the photon counting value,
wherein the controller is configured to:
control, when the photon counting value is equal to or greater than a preset threshold value, the sensitivity of the light receiving element to be a first sensitivity by adjusting the level of the quenching control voltage to a first level; and
control, when the photon counting value is less than the threshold value, the sensitivity of the light receiving element to be a second sensitivity by adjusting the level of the quenching control voltage to a second level higher than the first level.

2. The image sensing device according to claim 1, wherein the light receiving element includes a single-photon avalanche diode (SPAD) element.

3. The image sensing device according to claim 1, wherein the pixel includes:
a single-photon avalanche diode (SPAD) element configured to generate the pulse signal through a sensing node as avalanche breakdown is triggered by a single photon of incident light; and
a quenching circuit configured to perform a quenching operation by controlling a reverse bias voltage applied to the SPAD element.

4. The image sensing device according to claim 3, wherein the pixel further includes a precharge circuit configured to precharge the sensing node to a level of a power supply voltage according to an enable signal.

5. The image sensing device according to claim 4, wherein the quenching circuit and the precharge circuit are configured to operate complementarily to each other.

6. The image sensing device according to claim 3, wherein the SPAD element includes:
a cathode terminal connected to an input terminal of a first bias voltage; and
an anode terminal connected to the sensing node.

7. The image sensing device according to claim 3, wherein the quenching circuit includes a quenching transistor connected between the sensing node and an input terminal of a second bias voltage and configured to receive the quenching control voltage through a gate terminal thereof.

8. The image sensing device according to claim 7, wherein the quenching circuit is configured to control sensitivity of the SPAD element by adjusting resistance of the quenching transistor to change a quenching speed of a voltage level of the sensing node.

9. The image sensing device according to claim 1, further comprising a time-to-digital converter memory configured to store the photon counting value.

10. The image sensing device according to claim 1, wherein the controller is configured to generate an exposure control signal for controlling an exposure time of data acquired within one frame according to the photon counting value.

11. The image sensing device according to claim 10, wherein the controller is configured to:

control, when the photon counting value is equal to or greater than the threshold value, the exposure time to be a first time by adjusting the exposure control signal to the first level; and control, when the photon counting value is less than the threshold value, the exposure time to be a second time longer than the first time by adjusting the exposure control signal to the second level.

12. The image sensing device according to claim 10, wherein the controller is configured to:

preset a reference value for a noise level; and deactivate the exposure control signal and control the quenching control voltage, when the noise level is higher than the reference value.

13. The image sensing device according to claim 1, wherein the controller is configured to generate an optical power control signal for controlling optical power of emitted light applied to the target object according to the photon counting value.

14. The image sensing device according to claim 13, wherein the controller is configured to:

control, when the photon counting value is equal to or greater than the threshold value, the optical power of the emitted light to be a first intensity according to the optical power control signal; and control, when the photon counting value is less than the threshold value, the optical power of the emitted light to be a second intensity stronger than the first intensity according to the optical power control signal.

15. An image sensing device comprising:

a light receiving element connected between an input terminal of a first bias voltage and a sensing node;

a quenching circuit connected between the sensing node and an input terminal of a second bias voltage and configured to adjust a resistance value thereof based on a quenching control voltage; and a controller configured to control the quenching control voltage based on a counting value of photons reflected from a target object, wherein the controller is configured to:

control, when the counting value is equal to or greater than a preset threshold value, a sensitivity of the light receiving element to be a first sensitivity by adjusting a level of the quenching control voltage to a first level; and control, when the counting value is less than the threshold value, the sensitivity of the light receiving element to be a second sensitivity by adjusting a level of the quenching control voltage to a second level higher than the first level.

16. The image sensing device according to claim 15, further comprising a precharge circuit configured to precharge the sensing node to a level of a power supply voltage according to an enable signal.

17. The image sensing device according to claim 15, wherein the light receiving element includes a single-photon avalanche diode element.

18. A method of operating an image sensing device with a pixel including a light receiving element connected to a sensing node, the method comprising:

generating a pulse signal based on photons reflected from a target object;

counting a number of the photons to output a photon counting value;

generating a quenching control voltage having a level adjusted based on the photon counting value; and adjusting a quenching speed of a voltage level of the sensing node according to the level of the quenching control voltage to control sensitivity of the light receiving element, wherein controlling the sensitivity of the light receiving element comprises:

controlling the sensitivity of the light receiving element to be a first sensitivity by adjusting the level of the quenching control voltage to a first level when the photon counting value is equal to or greater than a preset threshold value; and controlling the sensitivity of the light receiving element to be a second sensitivity by adjusting the level of the quenching control voltage to a second level higher than the first level when the photon counting value is less than the preset threshold value.

* * * * *